United States Patent [19]

Akerberg

[11] 4,367,247

[45] Jan. 4, 1983

[54] PRIMER FOR PORTLAND CEMENT CONCRETE

[75] Inventor: Denis W. Akerberg, Huntley, Ill.

[73] Assignee: The Quaker Oats Company, Chicago, Ill.

[21] Appl. No.: 234,906

[22] Filed: Feb. 17, 1981

[51] Int. Cl.³ .............................................. B05D 3/10
[52] U.S. Cl. .................................. 427/302; 427/136; 427/407.1
[58] Field of Search ..................... 427/407.1, 302, 136; 260/926, 928, 933

[56] References Cited

U.S. PATENT DOCUMENTS

| | | | |
|---|---|---|---|
| 2,176,078 | 10/1939 | Katzman | 260/933 |
| 2,200,433 | 5/1940 | Ripley | 427/136 |
| 2,558,380 | 6/1951 | Pluddemann | 260/933 |
| 2,592,564 | 4/1952 | Hardman | 260/933 |
| 2,963,506 | 12/1960 | Lewinski | 260/933 |
| 3,235,627 | 2/1966 | Mansfield | 260/926 |
| 3,900,687 | 8/1975 | Meader et al. | 427/407.1 |
| 3,947,397 | 3/1976 | Schuster et al. | 427/302 |
| 4,258,090 | 3/1981 | Moraru | 427/386 |

*Primary Examiner*—Norman Morgenstern
*Assistant Examiner*—Janyce A. Bell
*Attorney, Agent, or Firm*—Neuman, Williams, Anderson & Olson

[57] ABSTRACT

A primer composition for portland cement concrete comprising the reaction product of polyphosphoric acid and an alcohol.

6 Claims, No Drawings

PRIMER FOR PORTLAND CEMENT CONCRETE

This invention relates to improving the durability of structures made from portland cement concrete.

A very common building material is concrete prepared by binding aggregate with portland cement. In many applications it is necessary to seal the portland cement concrete surface to prevent moisture penetration since the portland cement concrete surface is not impermeable. In still other applications, the portland cement concrete is exposed to attack by chemicals which causes deterioration of the concrete. For example, strong disinfectant solutions are frequently used in dairies to clean and sanitize floors. Repeated exposure of portland cement concrete floors to the action of chemicals such as disinfectant chemicals causes deterioration of the cement floors. The problems of impermeability and chemical attack on portland cement concrete structures has long been recognized. To overcome these problems, the art has employed coating materials to protect and seal the portland cement concrete. Furan resins possess a high degree of resistance to chemicals and are very durable and, accordingly, have found use as coating materials for portland cement concrete structures.

The present invention has for its principal object the provision of compositions which improve bonding between portland cement concrete and resinous coating materials.

Another object of the invention is to provide methods for treating portland cement concrete structures to improve the same.

The primer compositions which are used to improve bonding between portland cement concrete and protective resinous coating materials comprise the reaction product of polyphosphoric acid and an alcohol. Polyphosphoric acid is a known, commercially available chemical, available commercially from Stauffer Chemical Company. The Merck Index, 8th Edition, page 848, describes polyphosphoric acid as a viscous liquid at room temperature consisting of about 55% tripolyphosphoric acid, the remainder being $H_3PO_4$ and other polyphosphoric acids. It is also known as phospholeum or tetraphosphoric acid and has a typical analysis of 83% $P_2O_5$ with an ortho equivalent of 115.0%.

The alcohols which are reacted with the polyphosphoric acid are aliphatic (branched and unbranched), alkenyl (conjugated and unconjugated), aromatic and heterocyclic alcohols containing not more than 12 carbon atoms. Particularly preferred alcohols are the alcohols containing not more than 5 carbon atoms; representative of which are methanol, ethanol, 1-propanol, 2-propanol, 1-butanol, 2-butanol, isobutanol, tertiary butanol, 1-pentanol and mixtures thereof.

The primer compositions of the invention are prepared by adding from about 25 to 75%, preferably 40 to 60%, by weight of an alcohol or alcohol mixture to the polyphosphoric acid with mechanical stirring. The reaction of the alcohol and polyphosphoric acid is exothermic in nature and the temperature of the reaction mixture will rise initially. While the reaction temperature during the addition of the alcohol is not critical, it is preferable and convenient to maintain the reaction mixture at a temperature approximating that reached exothermically, say from 75 to 120° C. After the addition, the reaction mixture is heated at a temperature of 95° to 140° C. for 1-3 hours. After the reaction is complete, the reaction product, without further treatment or purification, is recovered and cooled if necessary. The reaction product can be cooled and stored for use as a primer. The liquid primer composition of this invention is believed to comprise a mixture of phosphates, phosphoric acid and polyphosphoric acid and has a much lower viscosity. For example, polyphosphoric acid has a viscosity of about 100,000 centipoises at 20° C. whereas the reaction product of 80 parts thereof with 20 parts of methanol has a viscosity of about 600 centipoises at 20° C.

For application as a primer to portland cement concrete structures, the primer composition should have a relatively low Brookfield viscosity, generally in the range of 30 to 100 centipoises and preferably in the range of 40 to 60 centipoises. The primer is applied to the concrete in any suitable manner, such as by spraying, painting or brushing. The amount of the primer to use is a sufficient amount to completely coat the concrete surface, generally on the order of 1 gallon of primer per 300 square feet of concrete. After a short interval of from 10 to 20 minutes, the resinous coating material is then applied and the primer serves as a catalyst to cure the resinous coating to a hard thermoset condition.

The primer compositions of this invention are used with the various acid curable thermosetting resins known to the art as being useful as coatings for portland cement concrete, such as phenol-aldehyde resins, urea-aldehyde resins, furan resins, e.g. furfuryl alcohol-urea resins, furfuryl alcohol-formaldehyde resins, furfuryl alcohol-resorcinol resins, furfuryl alcohol-melamine resins, furfuryl alcohol polymers, polymers of furfuraldehyde and like resins such as coal tar epoxies and polyester cement.

The advantages of the invention will be further apparent from the following examples and data.

EXAMPLE 1

Polyphosphoric acid (75 parts, 115% ortho equivalent) is charged into a flask equipped with a mechanical stirrer, thermometer and condenser. 1-Pentanol (25 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a primer.

EXAMPLE 2

Polyphosphoric acid (60 parts, 115% ortho equivalent) is charged into a flask equipped with a mechanical stirrer, thermometer and condenser. 2-Butanol (40 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a primer.

EXAMPLE 3

Polyphosphoric acid (70 parts, 115% ortho equivalent) is charged into a flask equipped with a mechanical stirrer, thermometer and condenser. Ethanol (30 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a primer.

EXAMPLE 4

Polyphosphoric acid (65 parts, 115% ortho equivalent) is charged into a flask equipped with a mechanical stirrer, thermometer and condenser. 1-Propanol (35 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature. and is ready for use as a primer.

EXAMPLE 5

Polyphosphoric acid (50 parts, 115% ortho equivalent) is charged into a flask equipped with a mechanical stirrer, thermometer and condenser. Methanol (50 parts) is added dropwise over a period of 30 minutes. The reaction is exothermic. During the addition the temperature of the reaction mixture is kept at 85° C. After the addition the reaction mixture is heated to 100° C. and maintained at that temperature for 1hour. The reaction product is cooled to ambient temperature and is ready for use as a primer.

EXAMPLE 6

Four-by-four inch (4"×4") slabs of Sakrete cement mix are cured 28 days at ambient temperature. The cement slabs are painted with a primer comprising the reaction product of 50 parts of polyphosphoric acid and 50 parts of methanol. The viscosity of the primer composition is 50 centipoises. Fifteen minutes after applying the primer composition to the cement slabs, the slabs are coated with furfuryl alcohol resin (8–10 centipoises), furfuryl alcohol polymer (400–500 centipoises), furfuryl alcohol-phenolic resin (3000 centipoises) and furfuryl-phenolic resin (450 centipoises). After one-half hour all of the resins are tacky and after 1 hour all of the resins are tack free except the furfural-phenolic resin. After standing overnight, all slabs were hard except the one coated with the furfural-phenolic resin. A crosshatch test was performed on each slab by scoring into squares, covering with masking tape and subsequently tearing off. The adhesion of the resinous coating to the concrete slabs in all cases was good.

EXAMPLE 7

A composition was prepared by reacting 15 parts of methanol with 85 parts of polyphosphoric acid. The liquid reaction product was tested as a primer by coating 4×4 inch slabs of Sakrete cement which had been cured 28 days at ambient temperature. Fifteen minutes after application of the primer composition, one-half of the slab was coated with furfuryl alcohol polymer (400–500 centipoises) and one-half with furfuryl alcohol resin (8–10 centipoises). No bond to the concrete resulted.

EXAMPLE 8

Biscuits or briquettes of Portland cement concrete, that is a formation of Portland cement shaped in a characteristic way (a "dog bone" shape) were prepared and cured 28 days at ambient temperature. Various compositions were applied to the biscuits as primers and various resin coating materials were applied thereto. The so-called "dog bone" biscuits were then placed in a machine adapted to determine what the tensile and ultimate yield strengths of the parts thus formed are. The shape of a typical briquette or biscuit is well known to those skilled in the foundry core art and accordingly the characteristics thereof are not discussed further herein. For Example, however, reference is made to such a typical biscuit in a book entitled *Steel Foundry Practice*, by J. H. Hall, (Penton Publishing Co., Cleveland, Ohio, 1950) where such unit is shown and described of page 8. Samples were prepared as follows:

Sample No. 1

One-half portland cement concrete "dog biscuits" were painted on the end with 65% toluene sulfonic acid. Then, after 15 minutes, furfuryl alcohol resin was applied over the primer. Then the remaining half of the biscuit was cast of furan polymer concrete.

Sample No. 2

One-half portland cement concrete "dog biscuits" were painted on the end with a primer comprising the reaction product of 50 parts polyphosphoric acid and 50 parts methanol. Then, after 15 minutes, furfural-phenolic resin was applied over the primer. Then the remaining half of the biscuit was cast of furan polymer concrete.

Sample No. 3

One-half portland cement concrete "dog biscuits" were painted on the end with 65% toluene sulfonic acid. Then, after 15 minutes, the ends of the biscuits were coated with furfuryl alcohol resin (8–10 centipoises). The biscuits were permitted to cure for 24 hours at room temperature and then furan polymer concrete was applied to complete the biscuit.

Sample No. 4

One-half portland cement concrete "dog biscuits" were painted with the reaction product of 50 parts of polyphosphoric acid and 50 parts of methanol. Then, after 15 minutes, the biscuits were coated with furfuryl alcohol resin (8–10 centipoises) and the biscuits were permitted to cure for 24 hours before furan polymer concrete was applied to complete the biscuit.

Sample No. 5

The same procedure as Sample No. 4 except that furfuryl alcohol polymer (400–500 centipoises) was used in lieu of the furfuryl alcohol resin.

Sample No. 6

The same procedure as Sample No. 4 except that furfuryl alcohol phenolic resin (3000 centipoises) was used in lieu of the furfuryl alcohol resin.

Sample No. 7

The same procedure as Sample No. 4 except that furfural-phenolic resin was used in lieu of the furfuryl alcohol resin.

Sample No. 8

One-half portland cement concrete "dog biscuits" were painted on the end with triethylenetetramine and furfural-phenolic resin (450 centipoises). The biscuits were permitted to cure for 24 hours at ambient temperature and then furan polymer concrete was applied to form the remaining half of the biscuit.

Sample No. 9

The same procedure as for Sample No. 8 except that before the furan polymer concrete was applied, the furfural-phenolic resin was washed with 65% toluene sulfonic acid.

Sample No. 10

The same procedure as for Sample No. 8 except that a 50% solution of NAOH was used as a primer in lieu of the triethylenetetramine.

Sample No. 11

The same procedure as for Sample No. 8 except that furfural was used in lieu of the furfural-phenolic resin.

Sample No. 12

The same procedure as for Sample No. 11 except that a 50% solution of sodium hydroxide was used in place of the triethylenetetramine.

All samples were cured for 24 hours in a mold and then 24 hours out of the mold before testing. The samples were tested for tensile strength. In addition, visual inspection was conducted for separation of the coating from the cement and rated on a percentage failure basis. The results are shown in the following table.

TABLE I

| Sample No. | Tensile/psi | % Bond Fail | % Cement Fail |
|---|---|---|---|
| 1 | 265 | 80% | 20% |
| 2 | 150 | 100% | 0% |
| 3 | 135 | 75% | 25% |
| 4 | 195 | 0% | 100% |
| 5 | 200 | 0% | 100% |
| 6 | 155 | 80% | 20% |
| 7 | 170 | 75% | 25% |
| 8 | 45 | 100% | 0% |
| 9 | 90 | 100% | 0% |
| 10 | 135 | 80% | 20% |
| 11 | 125 | 100% | 0% |
| 12 | 95 | 100% | 0% |

EXAMPLE 9

Specimens were prepared as follows: One-half of a portland cement "dog bone" biscuit was coated with a primer comprising the reaction product of 50 parts of polyphosphoric acid and 50 parts of methanol. Fifteen minutes later furfuryl alcohol resin (8–10 centipoises) was applied. The primer was applied so that when the other half of the tensile biscuit was cast with furan polymer concrete the primer had cured at ambient temperature for 4, 8 and 24 hours. The complete biscuit was allowed to cure overnight at ambient temperature in the mold and 24 hours at ambient temperature out of the mold.

The thermocycling test was conducted using boiling water and ice water (32° F.). Biscuits were cycled for different time periods as follows: Control: No thermocycling A. Specimens were cycled at 1 minute intervals five times each and allowed to return to ambient temperature.
B. Specimens were cycled for 5 minute intervals two times each and allowed to return to ambient temperature.
C. Specimens were cycled one time for ten minutes and allowed to return to ambient temperature.

They then set overnight and were tested for tensile strength and percent bond or concrete failure.

| Cycle | Tensile | % Bond Failure | % Concrete Failure |
|---|---|---|---|
| 4 Hour Primer Cure: | | | |
| Control | 300 psi | 0% | 100% |
| A | 115 psi | 20% | 80% |
| B | 130 psi | 10% | 90% |
| C | 110 psi | 0% | 100% |
| 8 Hour Primer Cure: | | | |
| Control | 260 psi | 0% | 100% |
| A | 100 psi | 25% | 75% |
| B | 100 psi | 25% | 75% |
| C | 125 psi | 0% | 100% |
| 24 Hour Primer Cure: | | | |
| Control | 225 psi | 0% | 100% |
| A | 135 psi | 0% | 100% |
| B | 75 psi | 0% | 100% |
| C | 190 psi | 0% | 100% |

EXAMPLE 10

Twelve "dog bone" biscuit halves made of portland cement concrete were sanded smooth. Duplicate biscuit halves were treated as follows:

Twenty-four hours before pouring the polymer concrete mix in the other half of the mold, duplicate biscuit halves were painted with the reaction product of 50 parts of polyphosphoric acid and 50 parts of methanol. Then, after 15 minutes, the biscuit halves were coated with a furfuryl alcohol resin (8–10 centipoises).

Eight hours before pouring the polymer concrete mix, two biscuit halves were painted with the reaction product of 50 parts of polyphosphoric acid and 50 parts of methanol. Then, after 15 minutes, the biscuit halves were coated with furfuryl alcohol resin (8–10 centipoises).

Eight hours before pouring the polymer concrete mix, two biscuit halves were painted with 50parts of phosphoric acid in water. Then, after 15 minutes, the biscuit halves were coated with furfuryl alcohol resin (8–10 centipoises).

Four hours before pouring the polymer concrete mix, two biscuit halves were painted with the reaction product of 50 parts of polyphosphoric acid and 50 parts of methanol. Then, after 15 minutes, the biscuit halves were coated with furfuryl alcohol resin (8–10 centipoises).

Two hours before pouring the polymer concrete mix, two biscuit halves were painted with the reaction product of 50 parts of polyphosphoric acid and 50 parts of methanol. Then, after 15 minutes, the biscuit halves were coated with furfuryl alcohol resin (8–10 centipoises).

Thirty minutes before pouring the polymer concrete mix, two biscuit halves were painted with the reaction product of 50 parts of polyphosphoric acid and 50 parts of methanol. Then, after 15 minutes, the biscuit halves were coated with a furfuryl alcohol resin (8–10 centipoises).

A polymer concrete mix was prepared in the other half of the mold and permitted to stand overnight. The biscuits were demolded in the morning and permitted to cure 24 hours out of the mold at ambient temperature. The polymer concrete mix to form one-half of the biscuit was as follows:

44.2% W.Q. Stone #1
17.7% W.Q. Sand #45
26.6% Silica Flour #295
10.5% Furfuryl alcohol resin (8-10 centipoises)
1.0% 65% Toluenesulfonic Acid
The test results are recorded below:

| No. Hours | Coated | Tensile Strength (psi) | Average Tensile Strength | % Failure % Bond | | % Failure % Concrete | |
|---|---|---|---|---|---|---|---|
| 24-1 | Polyphosphoric Acid/Methanol | 225 | 248 | 0% | 0% | 100% | 100% |
| 24-2 | Polyphosphoric Acid/Methanol | 270 | | 0% | | 100% | |
| 8-1 | Polyphosphoric Acid/Methanol | 180 | 210 | 10% | 5% | 90% | 95% |
| 8-2 | Polyphosphoric Acid/Methanol | 240 | | 0% | | 100% | |
| 4-1 | Polyphosphoric Acid/Methanol | 185 | 175 | 10% | 20% | 90% | 80% |
| 4-2 | Polyphosphoric Acid/Methanol | 165 | | 30% | | 70% | |
| 2-1 | Polyphosphoric Acid/Methanol | 210 | 178 | 95% | 73% | 5% | 28% |
| 2-2 | Polyphosphoric Acid/Methanol | 145 | | 50% | | 50% | |
| ½-1 | Polyphosphoric Acid/Methanol | 160 | 160 | 100% | 100% | 0% | 0% |
| ½-2 | Polyphosphoric Acid/Methanol | 160 | | 100% | | 0% | |
| 8-1 | Phosphoric Acid/$H_2O$ | 160 | 163 | 0% | 0% | 100% | 100% |
| 8-2 | Phosphoric Acid/$H_2O$ | 165 | | 0% | | 100% | |

EXAMPLE 11

A series of tests identical to those described in Example 10 were conducted except that all of the "dog bone" biscuit halves were primed with a 50% solution of phosphoric acid in water. The results are tabulated below:

| No. Hours | Coated | Tensile Strength (psi) | Average Tensile Strength | % Failure % Bond | | % Failure % Concrete | |
|---|---|---|---|---|---|---|---|
| 24-1 | Phosphoric Acid/$H_2O$ | 420 | 352 | 0% | | 100% | 100% |
| 24-2 | Phosphoric Acid/$H_2O$ | 283 | | 9% | | 100% | |
| 8-1 | Phosphoric Acid/$H_2O$ | 68 | 158 | 100% | | 0% | 30% |
| 8-2 | Phosphoric Acid/$H_2O$ | 247 | | 40% | | 60% | |
| 4-1 | Phosphoric Acid/$H_2O$ | 179 | 182 | 80% | | 20% | 20% |
| 4-2 | Phosphoric Acid/$H_2O$ | 185 | | 80% | | 20% | |
| 2-1 | Phosphoric Acid/$H_2O$ | 241 | 220 | 100% | | 0% | 0% |
| 2-2 | Phosphoric Acid/$H_2O$ | 200 | | 100% | | 0% | |
| ½-1 | Phosphoric Acid/$H_2O$ | 74 | 62 | 100% | | 0% | 0% |
| ½-2 | Phosphoric Acid/$H_2O$ | 49 | | 100% | | 0% | |

EXAMPLE 12

Six whole portland cement concrete "dog biscuits", one inch cross section, were formed to serve as a control (Set I). Nine one-half portland cement concrete "dog biscuits" were painted on the ends with a solution of hydrochloric acid as a primer and then approximately 15 minutes later furfuryl alcohol polymer (400-500 centipoises) was painted on the end on top of the primer (Set II). Also, nine "dog biscuits" were painted on the ends with a mixture of furfuryl alcohol polymer (400-500 centipoises) having admixed therewith an acid chloride catalyst (Set III). Six one-half "dog biscuits" had nothing painted on them (Set IV).

Nine one-half "dog biscuits" were painted on the end with a solution of hydrochloric acid and then 15 minutes later the ends were painted with furfuryl alcohol resin (8-10 centipoises) (Set V). All of the sets II through V were then returned to a mold and the remaining one-half of the "dog bone" biscuits were cast with a furan polymer concrete. The tensile strength of the biscuits was tested after 24 hours, 48 hours, and in the case of the test samples one week.

Tensile Testing Results (Set I)

| Set I: | 1 - 321 psi | 4 - 123 psi | Avg. 233 psi |
|---|---|---|---|
| | 2 - 80 psi | 5 - 117 psi | |

-continued

| | 3 - 49 psi | 6 - 370 psi | |
| --- | --- | --- | --- |
| | 24 Hours | 48 Hours | 1 Week |
| Set II | 1 - 12 psi | 1 - 15 psi | 1 - 65 psi |
| | 2 - 12 psi | 2 - 12 psi | 2 - 50 psi |
| | 3 - 19 psi | 3 - 16 psi | 3 - 35 psi |
| | Avg - 14 psi | Avg - 14 psi | Avg - 60 psi |
| Set III | 1 - 19 psi | 1 - 12 psi | 1 - 55 psi |
| | 2 - 19 psi | 2 - 12 psi | 2 - 65 psi |
| | 3 - | 3 - 53 psi | 3 - 60 psi |
| | Avg - 19 psi | Avg - 26 psi | Avg - 60 psi |
| Set IV | 1 - 25 psi | 1 - 19 psi | 1 - 50 psi |
| | 2 - 12 psi | 2 - 12 psi | 2 - 50 psi |
| | 3 - 25 psi | 3 - 10 psi | 3 - 30 psi |
| | Avg - 21 psi | Avg - 14 psi | Avg - 43 psi |
| Set V | 1 - 12 psi | 1 - 55 psi | 1 - 10 psi |
| | 2 - 25 psi | 2 - 12 psi | 2 - 15 psi |
| | 3 - 12 psi | 3 - Broken | 3 - Broken |
| | Avg - 16 psi | Avg - 33.5 psi | Avg - 13 psi |

Those modifications and equivalents which fall within the spirit of the invention are to be considered a part thereof.

What is claimed is:

1. A method of treating portland cement concrete which comprises first applying to the surface of the concrete a liquid comprising the reaction product of polyphosphoric acid and an alcohol and then applying to the primed surface an acid curable thermosetting resin.

2. A method in accordance with claim 1 wherein the alcohol is an aliphatic alcohol containing not more than 5 carbon atoms.

3. A method in accordance with claim 1 wherein the alcohol is methanol.

4. A method in accordance with claim 1 wherein the acid curable thermosetting resin is a furan resin.

5. A method in accordance with claim 4 wherein the furan resin is a furfuryl alcohol resin.

6. A method in accordance with claim 4 wherein the furan resin is a furfuryl alcohol-formaldehyde resin.

* * * * *